(12) United States Patent
Kim et al.

(10) Patent No.: US 6,570,833 B2
(45) Date of Patent: May 27, 2003

(54) METHOD FOR CRYSTALLIZING OPTICAL DATA STORAGE MEDIA USING JOULE HEAT AND APPARATUS THEREFOR

(75) Inventors: Chang-Jong Kim, Chungju-Shi (KR); Woon-Seng Yeo, Chungju-Shi (KR); Myong-Ryeong Kim, Euiwang-Shi (KR); Hun Seo, Yongin-Shi (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/055,296

(22) Filed: Apr. 6, 1998

(65) Prior Publication Data

US 2001/0043550 A1 Nov. 22, 2001

(30) Foreign Application Priority Data

Sep. 24, 1997 (KR) ............................................. 97-48544

(51) Int. Cl.[7] ................................................. G11B 7/00
(52) U.S. Cl. ......................................... 369/126; 365/113
(58) Field of Search ............................. 369/126, 275.2, 369/14, 100; 365/113

(56) References Cited

U.S. PATENT DOCUMENTS

| | | | | |
|---|---|---|---|---|
| 3,271,591 A | * | 9/1966 | Ovshinsky | 327/500 |
| 3,530,441 A | * | 9/1970 | Ovshinsky | 365/113 |
| 3,801,966 A | * | 4/1974 | Terao | 365/113 |
| 3,988,720 A | * | 10/1976 | Ovshinsky | 365/113 |
| 4,773,060 A | * | 9/1988 | Shimada et al. | 369/100 |
| 5,024,927 A | * | 6/1991 | Yamada et al. | 430/495 |
| 5,254,382 A | * | 10/1993 | Ueno et al. | 346/135.1 X |
| 5,341,328 A | * | 8/1994 | Ovshinsky et al. | 365/163 |
| 5,646,930 A | * | 7/1997 | Furumiya | 369/116 |
| 5,684,778 A | * | 11/1997 | Yamada et al. | 369/100 |
| 5,736,657 A | * | 4/1998 | Ide et al. | 430/270.13 X |
| 5,785,828 A | * | 7/1998 | Yamada et al. | 428/64.5 X |
| 5,910,932 A | * | 6/1999 | Watanabe et al. | |
| 6,060,221 A | * | 5/2000 | Furukawa et al. | 369/100 X |

FOREIGN PATENT DOCUMENTS

| | | |
|---|---|---|
| JP | 61-208648 | 9/1986 |
| JP | 62-239325 | 10/1987 |
| JP | 63-61424 | 3/1988 |
| JP | 7-29175 | * 1/1995 |
| JP | 9-326139 | 12/1997 |

OTHER PUBLICATIONS

Translation of JP 9–326139.*
Appl. Phys.Lett., vol. 23,No. 7/: Hard optical storage through electrical sensitivity switching/ Morikawa et al, Oct. 1973.*
Abstract, esp@cenet database, English–language Abstract of JP61208648, Sep. 17, 1986, Fujitsu Ltd.

* cited by examiner

*Primary Examiner*—Aristotelis M. Psitos
(74) *Attorney, Agent, or Firm*—Birch, Stewart, Kolasch & Birch, LLP

(57) ABSTRACT

A method and apparatus for initializing a recording film by heating it over its crystallizing temperature with heat that is generated based on the current flowing on the recording film or induced thereon, the current being generated from applying electric energy to the recording film of a phase transformation typed optical disk. The electric energy is provided through conductive wires being directly in contact with the recording film, or through an induction heating technique in which electric energy is provided via induction.

10 Claims, 9 Drawing Sheets

FIG. 1
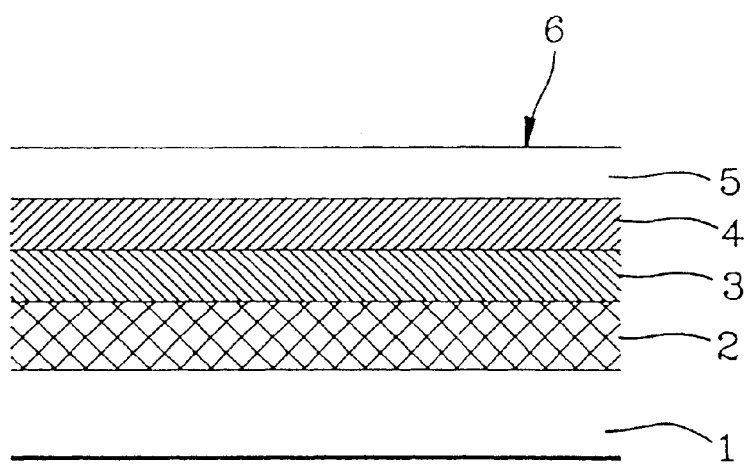
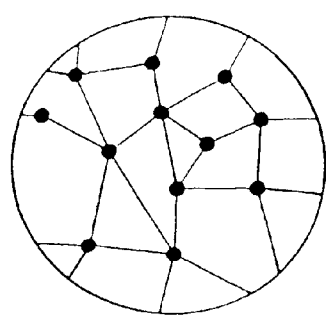
Fig.2a
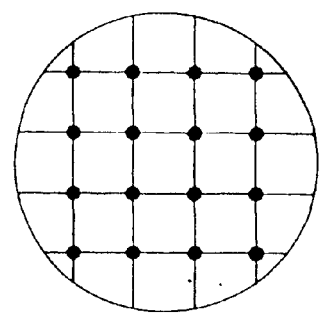
Fig.2b

METHOD FOR CRYSTALLIZING OPTICAL DATA STORAGE MEDIA USING JOULE HEAT AND APPARATUS THEREFOR

BACKGROUND OF THE INVENTION

1. Field of the Invention

The present invention relates to a method for initializing optical data storage media, and more particularly to a method and an apparatus for initializing an optical disk of a phase transformation type in a short time therefor.

2. Description of the Prior Art

Optical media of a phase transformation type are utilized as multimedia data storage media because of their large capacity as well as their high portability and reliability. This type of media is composed of an optical disk of a phase transformation type and an optical disk reproducing unit.

An optical disk of a phase transformation type stores and erases data based on an irradiating of laser beams on a recording film to heat a substrate, thereby inducing a phase transformation between two crystallographically divided phases to record and erase data. Two phases have the separate reflectance, respectively, so that data is reproduced by detecting the reflectance variation. That is, data is recorded by using laser beams to reversibly transform the phase of the material use to fabricate the recording film, the data being read based on the difference in an optical characteristic(reflectance) between the phases(crystalline phase/amorphous phase).

In the phase transformation between amorphous and crystalline phases, the amorphous phase is obtained by using laser beams to heat the recording film material over its melting point and then rapidly cooling it, while the crystalline phase is obtained by heating the material over its crystallizing temperature.

This phase transformation typed optical disk has the advantage that purely optical systems are simplified because only optical devices are employed to read and erase data. Also, the disk is useful in digital moving picture recording and voice recording because the overwriting operation can be directly performed using a single beam to shorten the recording time. Further, data recording can be performed without a magnet which generates a magnetic field. Thus, the optical unit may be thin. Additionally, a light source having a short wavelength is employed to get a high densified unit.

More specifically, recording and reproducing can be performed only by laser beams, without a magnetic head to apply a bias magnetic field, because an external magnetic field is not required in a recording process. Thus, the optical system becomes simplified, effectively decreasing the production cost, increasing compatibility and decreasing thickness.

Further, recording and erasing operations are each performed by the power modulation of laser beams, so that the direct overwriting is possible.

Because reproducing signals are obtained based on the variations in the intensity of reflected light which is generated by the reflectance difference between the two phases, these optical storage media are very compatible with the read-only typed disk such as a CD(compact disk) and the write-once and read-many typed disk.

Hereinafter, the general manufacturing process of the phase transformation typed optical disk will be described.

A digital master tape is made by the digital processing through a digital console, and then a code encoding process is performed to insert the sub-code representing the information related to a disk and to cut the disk using laser beams.

Then, several drops of photoresistor are dropped during the rotation of a spinner on glass that is ground evenly and precisely and is cleaned ultrasonically. The photoresistor forms a coating that is about 0.1 um thick, depending upon the rotation number of the spinner and the viscosity of the photoresistor.

A glass master is manufactured by exposing and developing the photoresistor with argon laser (wavelength of 457.9 nm) or He—Cd laser (wavelength of 441.6 nm).

A sheet of metal master is manufactured by plating the original photoresistor plate, and then several sheets of mother are manufactured. Several sheets of stamper are manufactured from the mother, and the stamper is subject to trimming to be provided for a molding device.

Next, as shown in FIG. 1, a polycarbonate substrate 1 is manufactured by injectedly molding the melted polycarbonate. A first dielectric layer 2, a recording film 3, a second dielectric layer 4 and a reflective layer 5 are stacked successively, and a protective layer(not shown) is formed thereon with the spinning technique to prevent the deterioration of film. Finally, a recording film is initialized, and the disk is tested to evaluate its quality.

The initializing process is necessary for the phase transformation typed optical disk, where the process of "initializing" involves crystallizing a stacked recording film which is made of materials constituting the recording film by sputtering to have a thickness of 50 to 500 Å by heating that stacked recording film over the crystallizing temperature. FIGS. 2a and 2b are schematic views showing the pre-transformation and post-transformation atomic arrangements of the materials constituting the recording film of the phase transformation typed optical disk, respectively.

Japanese Patent Unexamined Publication Nos. sho 60-106031 and sho 62-250533 disclose the conventional initializing methods.

In Japanese Patent Unexamined Publication No. sho 60-106031, a method is disclosed for using a laser beam to successively heat the optical disk track-by-track from its inner circumference to its outer circumference Specifically, according to the publication, a first laser diode is used to read/reproduce data A second higher powered laser diode capable of obtaining a laser spot of several to several hundred micrometers in size (generally 0.5 to 1 micrometers) is used to initialize the optical disk by successively heating the disk track-by-track. As a result, the conventional method effectively reduces the initializing and preventing the occurrence of cracks because the track-by-track heating leads to the lower heat load. However, using this method, even the reduced initializing time is to long, i.e. overall, it requires 30 min. to 1 hour to initialize disk since the initialization is performed track-by-track. Therefore in case of mass-producing the disk, the productivity is reduced, and the manufacturing cost is increased.

In order to overcome the above problems, Japanese Patent Unexamined Publication No. sho 62-250533 discloses a method for crystallizing an entire region of a recording film simultaneously by irradiating that region with a flash of light from a lamp. First, to initialize, the disk is heates to a temperature that exceeds the crystallizing temperature by applying 1 MW of power for the exposing time of 500 us (i.e. with the heat energy of about 500 J. A xenon lamp is employed as a light source in the publication. The instant exposure induces the stress which curves the disk. The curved disk restores its flat shape by annealing a stacked plurality of the curved disk with the irradiated light from a mercury lamp. The initializing process is completed by re-initializing the disk which rotates at a high speed according to the method disclosed in the Japanese Patent Unexamined Publication No. sho 60-106031.

However, this method has the problem that an additional process for making the disk flat such as an annealing process is required, because the heat energy which is instantly and unevenly irradiated to the disk with the xenon lamp of a relatively high power curves the disk. Thus, the productivity is reduced and the manufacturing cost is increased.

SUMMARY OF THE INVENTION

The present invention is devised to solve the foregoing problems. It is an object of the present invention to provide a method for initializing a phase transformation typed optical disk and an apparatus therefor capable of enhancing the productivity as well as the yield by means of initializing the disk simultaneously to shorten the initializing time and minimize the deformation of the disk.

To achieve the above object of the present invention, a method is proposed which comprises the steps of, applying electrical energy to a recording film of a phase transformation typed optical disk to generate heat caused by an electric current flowing over the recording film, and crystallizing the material constituting the recording film by heating the recording film to a temperature that exceeds the crystallizing temperature with the Joule heat.

According to an embodiment of the present invention, a method and apparatus are disclosed for initializing an optical disk by heating a recording film by directly contacting conductive wires to the recording film to apply an electric current over the recording film.

According to another embodiment of the present invention, a method and apparatus are disclosed for initializing a phase transformation typed optical disk by generating an induced current on the recording film by inducing heating without directly contacting conductive wires to the recording film, and heating the recording film with heat generated by the induced current.

A pair of the opposing conductive wires are connected to the inner circumference of the recording film of the optical disk through contacting parts, while another pair of opposing conductive wires are connected to the outer circumference thereof.

The initializing method according to the another embodiment of the present invention includes the steps of generating an induced current over a recording film by induction, and initializing a phase transformation typed optical disk with heat generated by the induced current.

The initializing apparatus according to the present invention for initializing a phase transformation typed optical disk having a recording film in which its optical properties are changed by the phase transformation comprises:

an electric source for applying a current;

conductive wires connecting a source of power to the recording film of the phase transformation typed optical disk;

contacts provided to the recording film and connected with the conductive wires; and a switch for opening or closing an electric circuit having the source of power, wherein a current is provided from the electric source if the switch is ON, the recording film being heated over its crystallizing temperature based on the heat generated by the current.

Further, the apparatus includes a high voltage alternating current (A.C.) source for applying a current, a switch for opening or closing an electric circuit having the A.C. source, and a heating inductance coil wound around the optical disk by a predetermined number of turns, wherein a current is provided from the A.C. source to the heating inductance coil if the switch is on, and wherein the recording film is heated over the crystallizing temperature by the heat generated by a current induced to the recording film by the magnetic flux generated inside the inductance coil.

The heat H is determined according to $H=I^2RT$, wherein I is the induced current, R is the resistance of the recording film and T is the applied time of current.

The heat H is determined by the initializing temperature of the recording film that represent a temperature required to initialize the recording film, and the heat conductivity, and the like. The applied voltage and time are determined by electric properties of the material of the recording film such as the resistance.

Preferably, the material may be a Ge—Sb—Te type alloy and a Ag—In—Sb—Te type alloy, but the constituents of which are not limited as this.

BRIEF DESCRIPTION OF THE DRAWINGS

The above objects and other advantages of the present invention will become more apparent by describing, in detail, preferred embodiments thereof with reference to the attached drawings, in which:

FIG. 1 is a view showing the structure of a phase transformation typed optical disk;

FIGS. 2a and 2b are schematic views each showing the atomic arrangement of a recording film of a phase transformation typed optical disk before and after the initialization;

DETAILED DESCRIPTION OF THE PREFERRED EMBODIMENT

Hereinafter, the preferred embodiment of the present invention will be described, in detail, with reference to the attached drawings.

First Embodiment

A method and apparatus are provided for initializing an optical disk by directly connecting conductive wires with the optical disk and heating a recording film by applying an electric power to the conductive wires.

It has been known that Joule heat is generated when a current flows through a resistant material. A generated amount of heat can be represented by $H=I^2RT$, wherein I is the applied current, R the resistance of a material, and T the applied time. Thus, if there is a resistant material, heating can be accomplished by applying a current.

The recording film can be sufficiently heated up to the crystallizing temperature according to the above principle, because the recording film of a phase transformation typed optical disk has conductive properties.

Meanwhile, in order to obtain the crystallizing temperature required to initialize the recording film according to the principle, it is understood that an applied current, a resistance of the recording film and an applied time of the current are necessary. The resistance of the conditions is determined, if a recording film is selected. If a heat amount required for initializing (e.g. about 500 to 550 J) is obtained, the applied current and time are not limited particularly. Below 500 J, there is a problem that the initialization ratio is reduced, while above 550 J, there is another problem that the disk is deteriorated. Therefore, when Ge—Sb—Te type alloy or Ag In Sb Te type alloy is used as a material of the recording film, the applied current and time can be appropriately selected from the known resistance. Further, the applied current can be appropriately selected in consideration of the kind and size of the material provided around the recording film, the thickness thereof and the variation of the heat capacity caused by the ambient environment.

Figure 3:
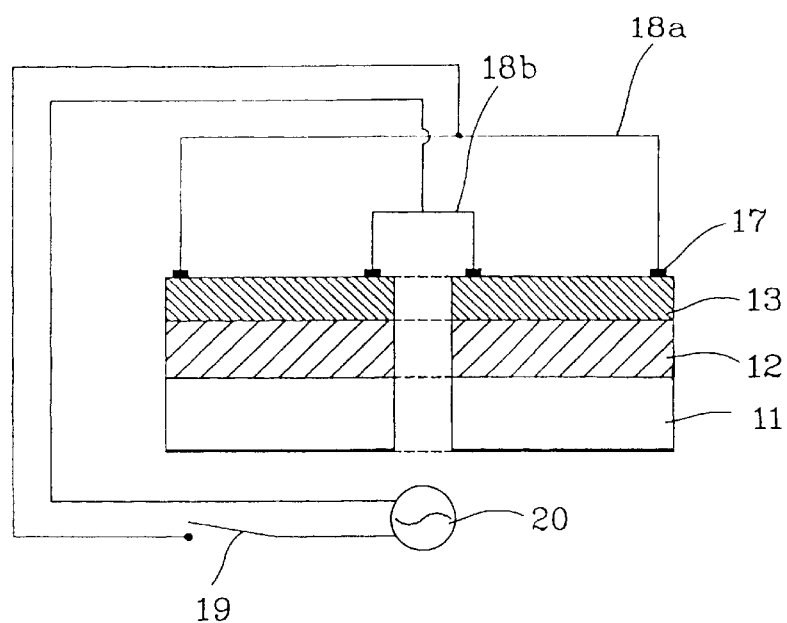
FIG. 3 is a schematic view of the first embodiment according to the present invention.

FIG. 3 schematically shows an initializing apparatus according to the first embodiment of the invention.

As shown in FIG. 3, in the initializing apparatus, ends of conductive wires are connected to an electric source 20, while the other ends are each divided into a respective pair of conductive wires 18a and 18b, conductive wire 18a being symmetrically connected to the outer circumference of a recording film 13 of an optical disk through contact parts 17, and conductive wire 18b being symmetrically connected to the inner circumference of recording film 13 through separate contact parts.

Electric source 20 of 600 to 1000 V is preferable, which is not limited particularly, so that the output voltage of electric source 20 can be appropriately selected if a heat amount required for initializing is obtained.

Preferably, conductive wires 18a and 18b may be a highly conductive material such as gold, silver and copper. Preferably form an economical standpoint, copper is used.

Figure 7:
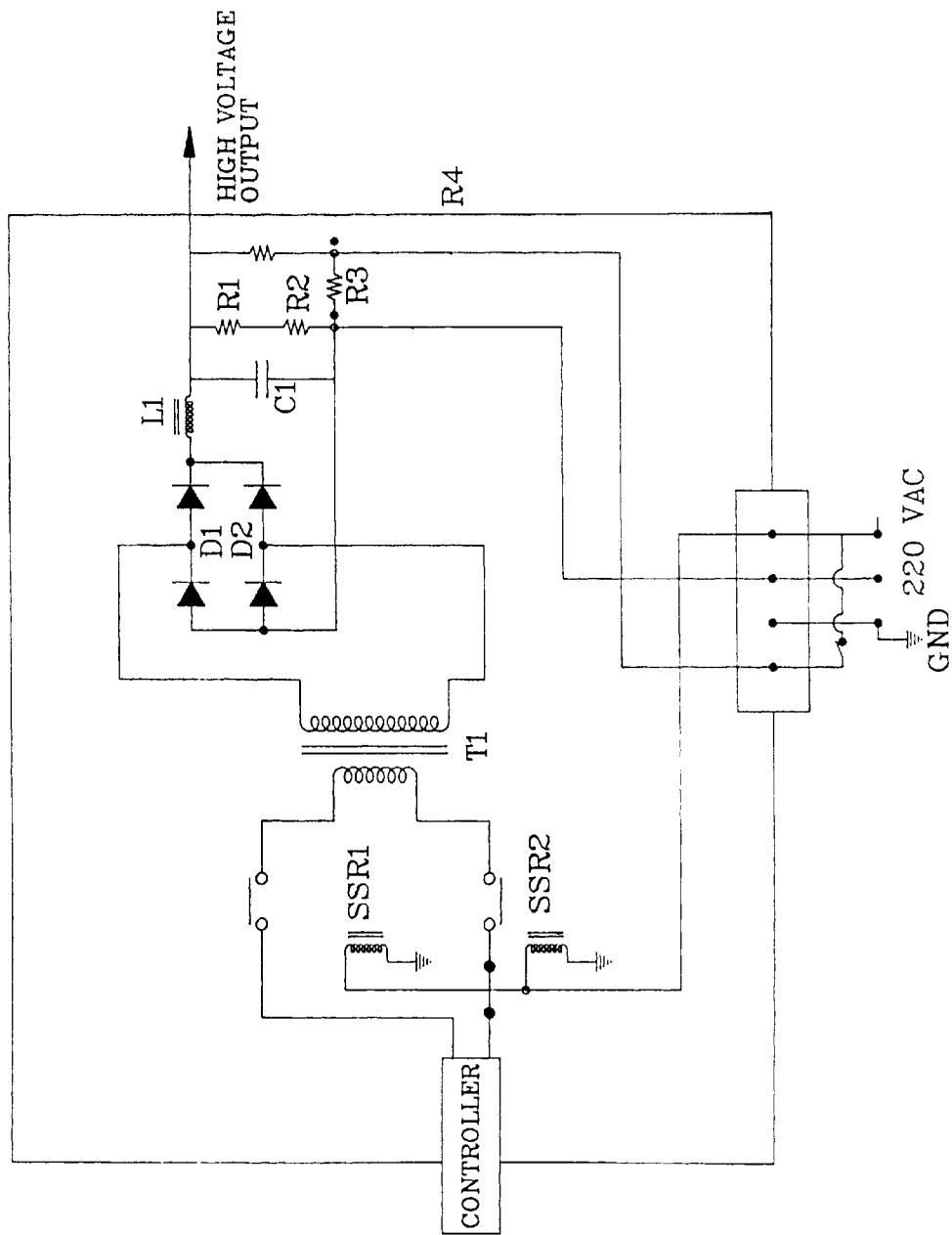
FIG. 7 shows a current cut-off circuit employed in the first embodiment according to the present invention.

In this case, in order to prevent the residual of energy after applying a current, a cut-off circuit as shown in FIG. 7 may be connected between the ends and the other ends of conductive wires 18, whereby the electric power is cut off after a lapse of the predetermined time for initialization to apply a high voltage. Besides, a generally known power source may be employed which is capable of outputting the voltage of 600 to 1000 V.

Figure 6:
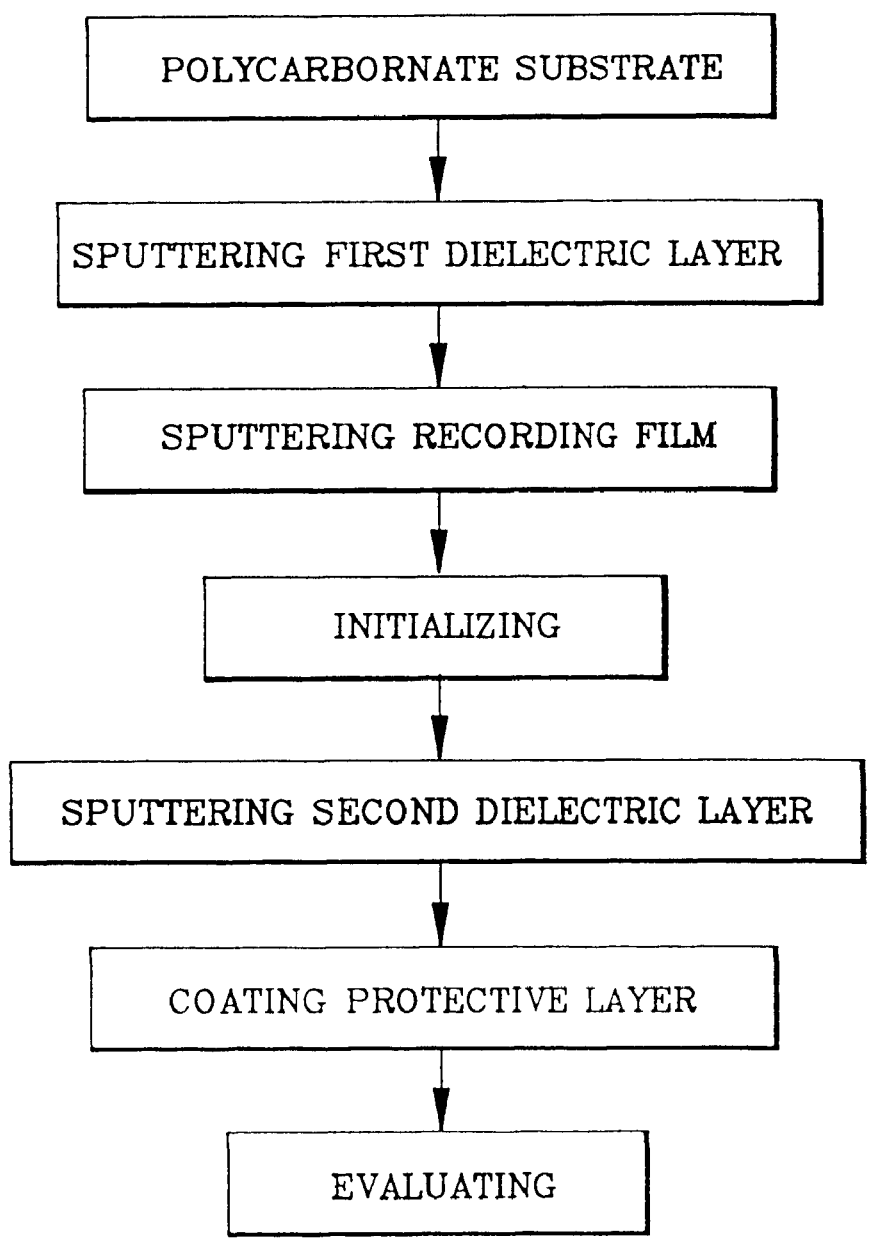
FIG. 6 is block diagram illustrating processes of the first embodiment according to the present invention.

Next, an initializing method, which is performed with the initializing apparatus, will be described with reference to FIGS. 3 and 6.

A first dielectric layer 12 of ZnS—SiO$_2$ is formed on a polycarbornate substrate 11 by sputtering in a thickness of 80 to 300 nm (Steps 61 and 62) and then a recording film 13 is formed thereon by sputtering in a thickness of 10 to 40 nm (Steps 63). The recording film 13 may be composed of GeSbTe, Ge$_2$Sb$_2$Te$_5$, Ge$_1$Sb$_2$Te$_4$, Ge$_1$Sb$_4$Te$_7$ and Ag—In—Sb—Te type alloy.

Conductive wires 18a are oppositely connected to the outer circumference of an optical disk, and conductive wires 18b are oppositely connected to the inner circumference thereof. After the connection, a switch 19 is turned ON to enable the flow of a current for initialization (Step 64).

A second dielectric layer of ZnS—SiO$_2$ (not shown) is then formed by sputtering in a thickness of about 10 to 90 nm (Step 65), and an Al reflecting layer (not shown) is formed thereon to make a phase transformation typed optical disk (Step 66). Then, the disk is evaluated (Step 67).

Figure 4:
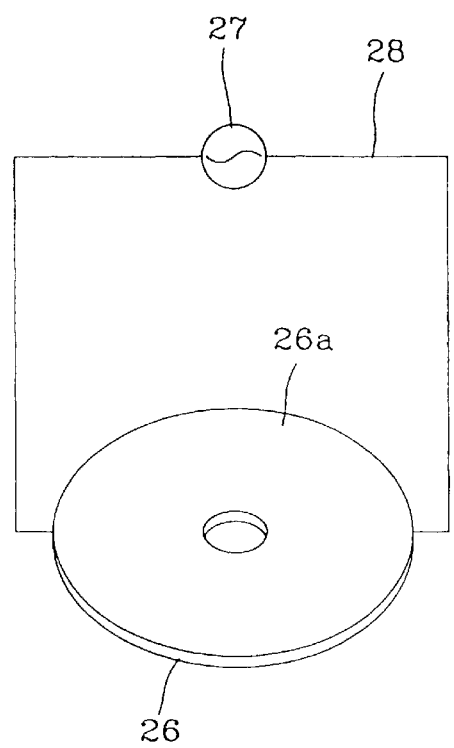
FIG. 4 is a schematic view of another example of the first embodiment according to the present invention.

FIG. 4 schematically shows another example of the first embodiment according to the present invention.

Conductive wires 28 are connected to the outer circumference of a recording film 26a of the optical disk 26, which is the same as FIG. 3 except that conductive wires 28 are not connected to the inner circumference of recording film 26a. If the resistance of recording film 26a and the supplied current are equal to the example of FIG. 3, the initializing time required for crystallizing becomes longer, while the constitution becomes more simple in comparison with the example of FIG. 3.

Figure 5:
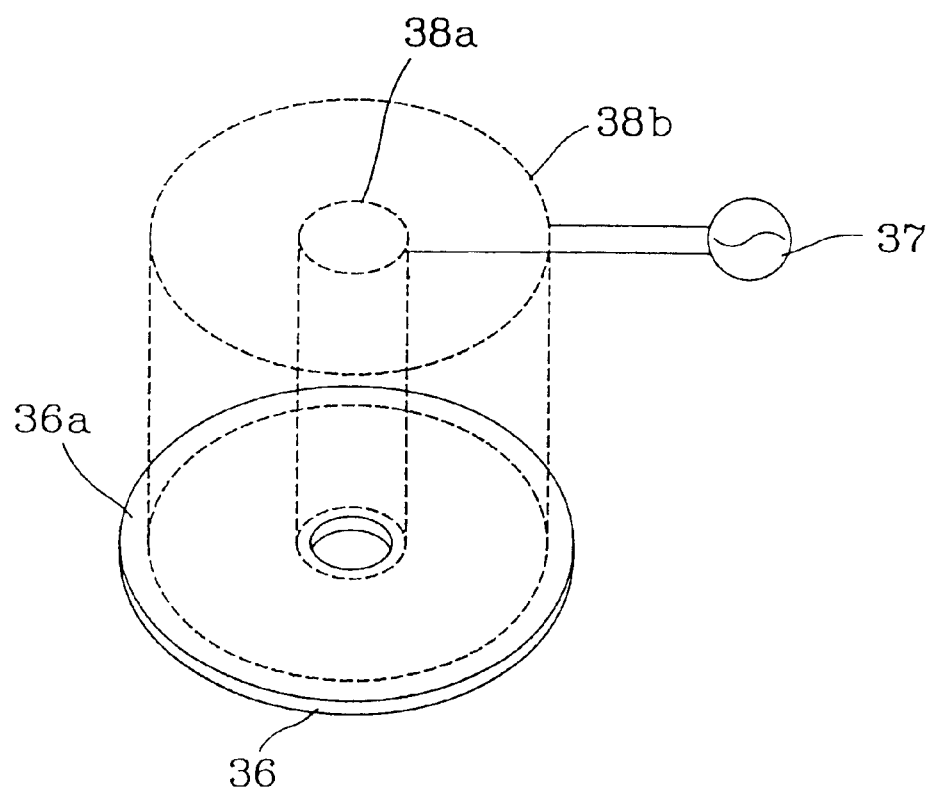
FIG. 5 is a schematic view of the second embodiment according to the present invention.

FIG. 5 shows another example of the initializing apparatus of the first embodiment according to the present invention.

As shown in FIG. 5, the initializing apparatus has an inner cylinder 38a of a small diameter connected to the inner circumference of an optical disk 36, and an outer cylinder 38b of a large diameter connected to the outer circumference thereof, inner and outer cylinder 38a and 38b being connected to an electric source 37 through conductive wires 39a and 39b, respectively. In this example, the recording film is protected from damage because the current load converges less into a local region of the recording film than in FIGS. 3 and 4.

Preferably, in consideration of the diameter of the optical disk of about 12 cm, the diameter of the outer cylinder is about 10 to 11.5 cm, and that of the inner cylinder is about 3 to 5 cm.

Preferably, the material of the cylinders may be a highly conductive material such as gold, silver and copper and even more preferably, copper from an economical standpoint.

The height of the cylinders is not particularly limited and can be selected to be appropriately connected to the recording film by the weight of the cylinders. The thickness of the cylinders also is not particularly limited and preferably is about 0.5 to 5 mm, because the connecting performance to the recording film is reduced and the recording film is damaged if the recording film is too thin.

Second Embodiment

In another feature of the invention, a method is provided for initializing a phase transformation typed optical disk using an induction heating technique.

Induction heating is a technique for heating a conductive material used as a load by current that is electromagnetically induced. An induction heating technique is specifically disclosed in "Experimental Metallurgy" of A. U. SEYBOLT, ph.D. and J. E. BURKE, ph.D. published by John Wiley & Son, Inc., 1953.

Figure 9:
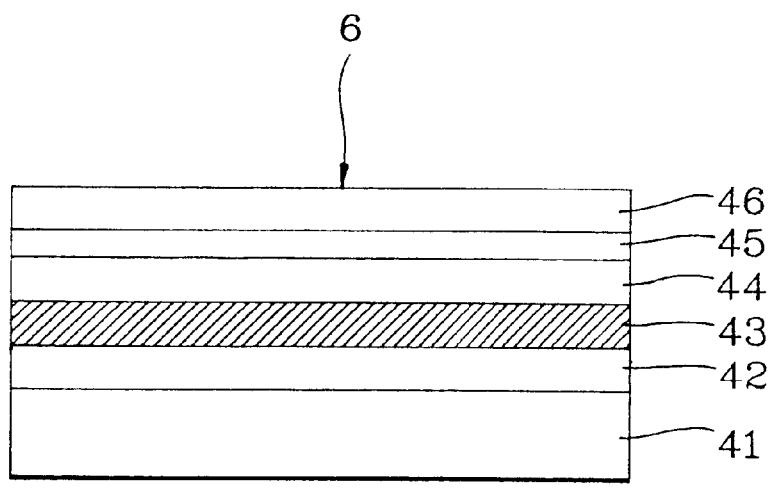
FIG. 9 is a schematic view of another example of the second embodiment according to the present invention.
Figure 9:
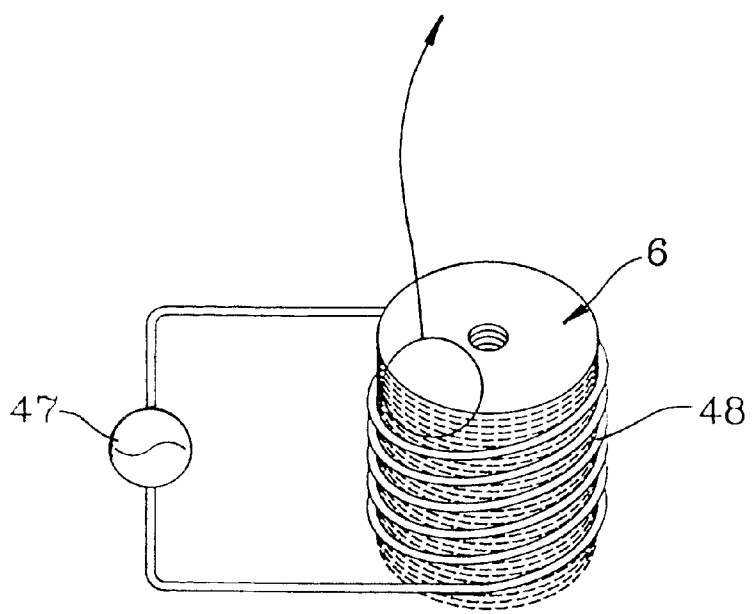

FIG. 9 shows an example of an initializing apparatus of the second embodiment according to the present invention.

As shown, the second embodiment of the invention comprises an electric source 47 and an induction coil 48, arranged to surround a plurality of optical disks 6.

Induction coil 48 is wound spirally or cylindrically, and is not limited particularly in structure so long as the induced magnetic field is effectively transferred to the recording film of the optical disk. In order to surround the optical disk, induction coil 48 is larger in diameter than the optical disk. Preferably, the material of the induction coil 48 may be a highly conductive material such as gold, silver and copper, and even more preferably, copper from an economical standpoint.

The stacking height (or number) of the optical disk can be adjusted in consideration of the penetrating depth of the induced magnetic lines of force.

In the induction heating, a plurality of stacked optical disks within the effective penetrating depth of the magnetic lines of force can be initialized simultaneously, so that the initializing time becomes much shorter than the first embodiment in view of the overall manufacturing processes of the optical disk.

Hereinafter, a method for initializing a phase transformation typed optical disk with the initializing apparatus will be described.

Figure 8:
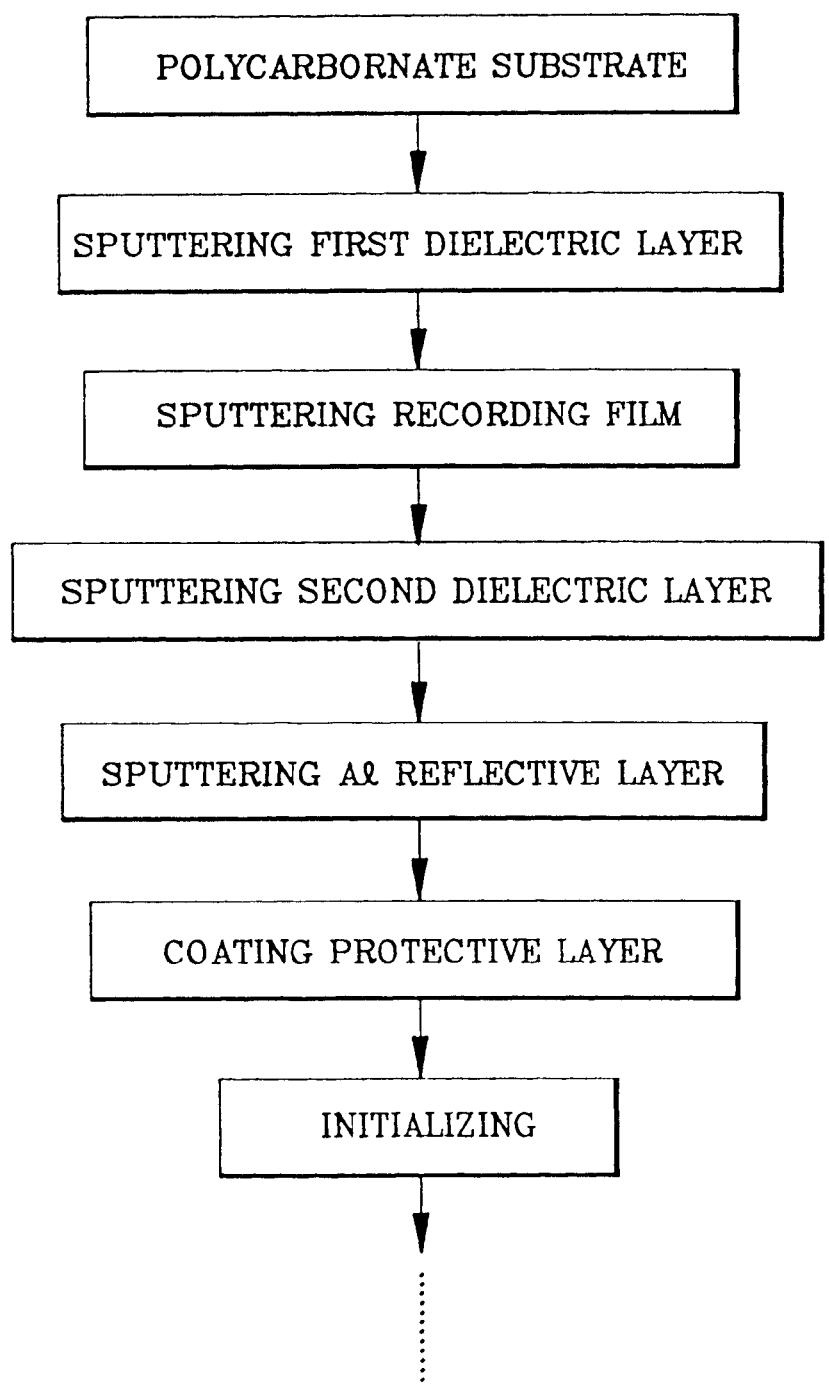
FIG. 8 is block diagram illustrating processes of the second embodiment according to the present invention.

FIG. 8 shows the manufacturing process of the optical disk according to the initializing method of the second embodiment of the invention. The particular steps of the process described by FIG. 8 are similar to those described by FIG. 6, but the order differs sue to the application of current via induction. Specifically, before initializing (Step 87), a polycarbonate substrate is formed (Step 81), a first dielectric layer, a recording film, a second dielectric layer and an aluminum Al reflective layer are successively sputtered (Steps 82–85), and a protection layer is coated (Step 86).

Figure 10:
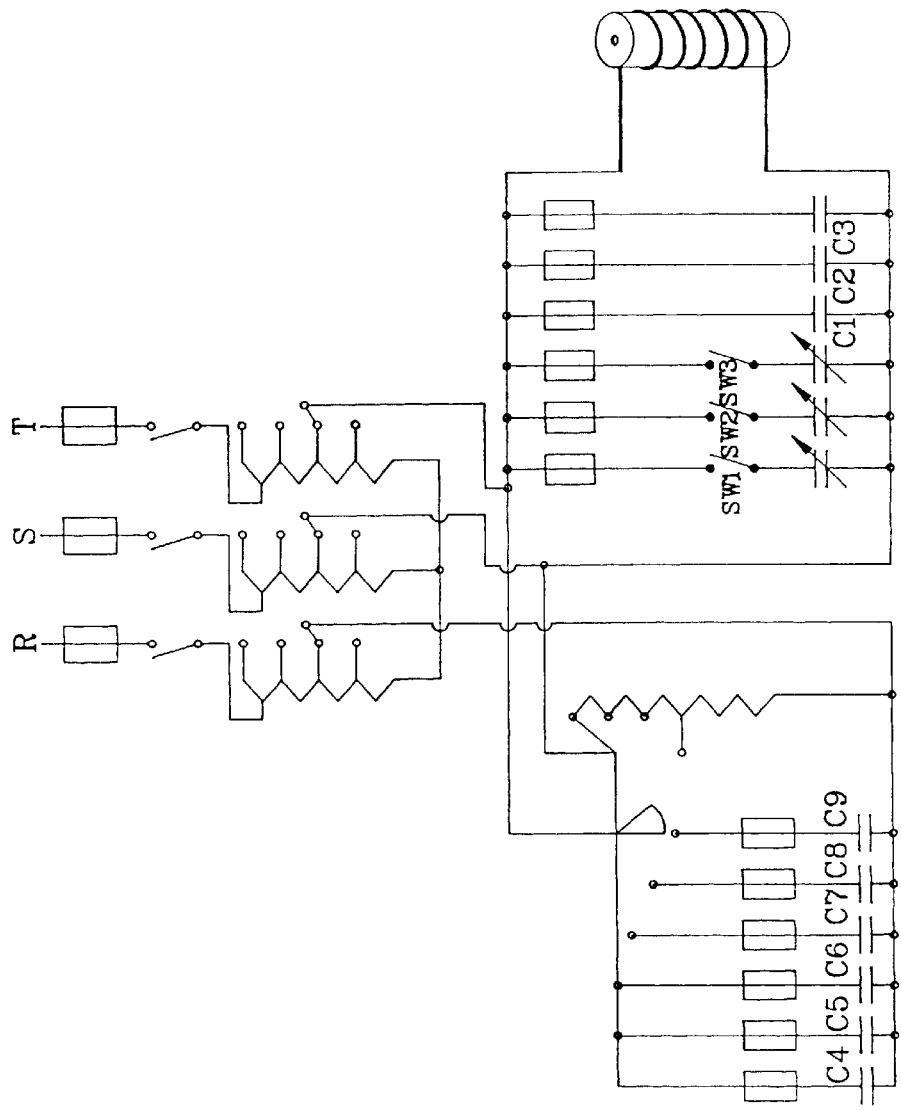
FIG. 10 shows a current cut-off circuit employed in the second embodiment according to the present invention.

As described in FIG. 8, a plurality of optical disks 6 each having a protective film is stacked (Step 81). Then the induction coil A8 is wound around the stacked optical disks in several turns. The turn number is determined so that the penetrating depth of electromagnetic lines induced by the induction coil is equal to or a little greater than the height of the stacked disks. The electric power is then cut off after a predetermined time for initializing using a current cut-off circuit, as shown in FIG. 10.

Preferably, the initialization may be performed within about 250 to 750 V during about 10 to 60 seconds. Below 250 V, the initializing time is generally to long. By contrast, above 750 J, the disk is deteriorated in spite of the shortening of the initializing time.

Figure 11:
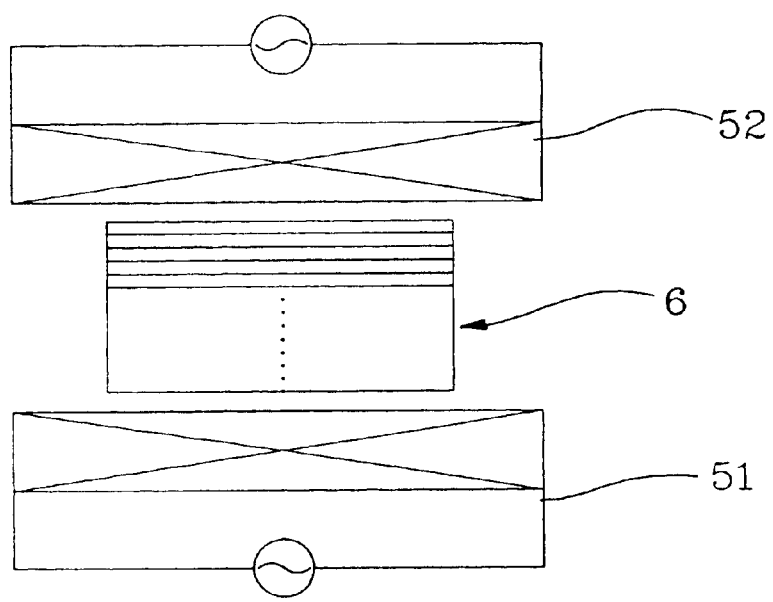
FIG. 11 is a schematic view of still another example of the second embodiment according to the present invention.

FIG. 11 shows another example of the second embodiment according to the present invention, in which two initializing apparatuses 51 and 52, as shown in FIG. 9, are disposed at upper and lower parts of the optical disk.

In FIG. 11, a plurality of phase transformation type optical disks 6 is disposed between an upper first initializing apparatus 52 and a lower second initializing apparatus 51, so that optical disks 6 are initialized by the energizing of the induction coil through the electric source. In this case, attention must be paid to the accordance of the direction of magnetic lines of force, because the magnetic lines of force induced by the upper and lower induction coils will offset each other if the current direction of the upper induction coil is equal to the current direction of the lower induction coil.

It is preferable that the current, cut-off circuit as shown in FIG. 10, is employed in order to prevent the damage of the optical disk resulting such as peeling-off that may otherwise be caused by the remaining energy.

In this embodiment, the first and second initializing apparatuses for induction heating 51 and 52 are each disposed at the upper and lower parts However, pairs of initializing apparatuses can also alternatively be disposed in parallel along the manufacturing line to initialize the optical disks, a pair of initializing apparatuses being composed of upper and lower initializing apparatuses.

Hereinafter, the initializing method of the phase transformation typed optical disk according to the first and the second embodiments will be explained in more detail through experimental examples.

Example 1

In the initializing method according to the first embodiment of the invention for initializing the optical disk by direct contact to the recording film thereof, the optimum conditions for initializing were determined as follows.

The first dielectric layer was deposited on a polycarbonate substrate of $ZnS$—$SiO_2$ with a thickness of 150 nm by sputtering, and then a recording film of GeSbTe was deposited thereon with a thickness of 30 nm by sputtering.

As shown in FIG. 3, an opposite pair of copper wires was connected to the inner circumference of an optical disk, and the other opposite pair thereof was connected to the outer circumference. Then the recording film was initialized by applying the A.C. voltage of 400, 600, 800 and 1000 V during 1 to 6 seconds after switch-on at the interval of 1 second.

Finally, a second dielectric layer of $ZnS$—$SiO_2$ was deposited with a thickness of about 30 nm by sputtering, and an Al reflecting layer was formed about 100 nm to manufacture a phase transformation typed optical disk.

The resultant optical disk was inspected visually or with a spectrophotometer to test the initialization, which results in as the following Table 1.

TABLE 1

|  | 400 V | 600 V | 800 V | 1000 V |
|---|---|---|---|---|
| 1.0 sec | X | Δ | ○ | ○ |
| 2.0 sec | X | Δ | ○ | ○ |
| 3.0 sec | X | Δ | ○ | □ |
| 4.0 sec | X | Δ | □ | □ |
| 5.0 sec | X | ○ | □ | □ |
| 6.0 sec | X | ○ | □ | □ |

In Table, X represents the non-initialization of the recording film, Δ the partial initialization thereof, ○ the perfect initialization thereof and □ the deterioration thereof.

As shown in Table 1, the phase transformation typed optical disk obtained by the first embodiment of the present invention was not initialized during 1 to 6 seconds at 400 V. It was partially initialized during 1 to 4 seconds at 600 V, while being almost initialized during 5 to 6 seconds. It was observed that the disk was perfectly initialized during 1 to 3 seconds at 800 V but the recording film was deteriorated during 4 to 6 seconds. Further the disk was mostly initialized during 1 to 2 seconds at 1000 V but the recording film was deteriorated during 3 to 6 seconds.

As a result, it should be understood that it is effective to initialize the disk during about 5 to 6 seconds at 600 V, about 1 to 3 seconds at 800 V and about 1 to 2 seconds at 1000 V.

The perfectly initialized optical disks of the obtained ones were recorded and reproduced in an evaluation deck. In the recording and reproducing, a Carrier to Noise (C/N) ratio and a erasing ratio were measured with an object lens having Numerical Aperture (NA) of 0.6 and a laser diode having a wavelength of 680 nm under the conditions of a peak power of 11 mW and a bias power of 5 mW. As a result, the C/N ratio was 55 dB, and the erasing ratio was 29 dB.

Therefore it could be understood that the initialization was well performed.

Example 2

In the initializing method according to the second embodiment of the invention for initializing the optical disk by the induction heating, the optimum conditions for initializing were determined as follows.

Eighteen sheets of the phase transformation typed optical disks obtained by the same procedure as Example 1 were stacked in the known frequency-induction heating device shown as a reference numeral 48 in FIG. 9. Then the recording film was initialized by applying the voltage of 250, 500 and 750 V during 60 seconds after swich-on at the interval of 10 seconds.

TABLE 2

Relationship between the outputting and applying voltage on initializing (at the frequency of 100 kHz to 1 MHz).

|  | 250 V | 500 V | 750 V |
|---|---|---|---|
| 10 sec | X | Δ | ○ |
| 20 sec | X | Δ | □ |
| 30 sec | X | ○ | □ |
| 40 sec | X | ○ | □ |
| 50 sec | X | ○ | □ |
| 60 sec | ○ | □ | □ |

In Table, X represents the non-initialization of the recording film, Δ the partial initialization thereof, ○ the perfect initialization thereof and □ the deterioration thereof.

As shown in Table 2, the optical disk was well initialized by the induction heating during 60 seconds at 250 V, during 30 to 60 seconds at 500 V and during about 10 seconds at 750 V.

The obtained optical disks were recorded and reproduced in an evaluation deck in order to inspect their initialized state. In the recording and reproducing, a C/N ratio and a erasing ratio were measured with an object lens having Numerical Aperture (NA) of 0.6 and a laser diode having a wavelength of 680 nm under the conditions of a peak power of 11 mW and a bias power of 5 mW. As a results, the C/N ratio was over 54 dB, and the erasing ratio was 27 dB. Therefore the initialization was well performed.

Example 3

Next, the phase transformation typed optical disks obtained by the same procedure as Example 1 were initialized by the induction heating under the same conditions as Example 2 except for using, as the material of the recording film, AgIn—Sb—Te type alloy instead of Ge—Sb—Te type alloy. The results are as follows.

TABLE 3

|  | 250 V | 500 V | 750 V |
|---|---|---|---|
| 10 sec | X | Δ | ○ |
| 20 sec | X | ○ | □ |
| 30 sec | X | ○ | □ |
| 40 sec | X | ○ | □ |
| 50 sec | ○ | □ | □ |
| 60 sec | ○ | □ | □ |

In Table, X represents the non-initialization of the recording film, Δ the partial initialization thereof, ○ the perfect initialization thereof and □ the deterioration thereof.

As shown in Table 3, the optical disk was well initialized by the induction heating over 50 seconds at 250 V, during 20 to 40 seconds at 500 V and during about 10 seconds at 750 V. The obtained optical disks were recorded and reproduced in an evaluation deck in order to inspect their initialized state. In the recording and reproducing, a C/N ratio and a erasing ratio were measured with an object lens having Numerical Aperture (NA) of 0.6 and a laser diode having a wavelength of 680 nm under the conditions of a peak power of 11 mW and a bias power of 5 mW. As a result, the C/N ratio was 57 dB, and the erasing ratio was 30 dB. Therefore the initialization was well performed.

As described above, the method and apparatus are provided for crystallizing the phase of the recording film by heating the constituting material of the recording film over its crystallizing temperature with the Joule heat which is obtained by applying the electric energy to the recording film of the phase transformation typed optical disk to generate the current flow or induced on the recording film, which results in making an effect that the initialization of the phase transformation typed optical disk is performed in a short time.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for initializing an optical storage media comprising:
   applying electric energy to a recording film of said optical storage media; and
   crystallizing a material forming said recording film based on heat solely generated in response to said electric energy applied to said recording film, the crystallizing being achieved without using a catalytic material, wherein a whole area of said recording film is simultaneously initialized for a recording operation, and wherein the electric energy is applied for approximately 6 seconds or less and the electric energy is applied at approximately 600 volts or more.

2. The method according to claim 1, wherein the material of said recording film is at least one of GeSbTe, $Ge_2Sb_2Te_5$, $Ge_1Sb_2Te_4$, $Ge_1Sb_4Te_7$ and Ag—In—Sb—Te type alloy.

3. The method according to claim 1, wherein the heat crystallizing a material forming said recording film based on heat generated in response to said electric energy applied to said recording film is determined based on:

$$H=I^2RT,$$

where I is an applied current corresponding to said electric energy, R is a resistance of said recording film, and T is an applying time of said applied current.

4. A method for initializing a recording film of an optical storage media, said recording film composed of a phase transformation type material, comprising:
   directly contacting conductive wires with said recording film;
   applying an electric current to said recording film; and
   changing a state of said recording film based on heat solely generated in response to said electric current applied to said recording film without using a catalytic material, wherein a whole area of said recording film is simultaneously initialized for a recording operation, and wherein the electric current is applied for approximately 6 seconds or less and the electric current is applied at approximately 600 volts or more.

5. The method according to claim 4, wherein said conductive wires comprise:

a pair of wires which contact opposing sides of an inner circumference of the optical storage media through contacting parts.

6. The method according to claim 4, wherein the heat generated in response to said electric current applied to said recording film is determined based on:

$$H=I^2RT,$$

where I is an applied current, R is a resistance of said recording film, and T is an applying time of current.

7. The method according to claim 4, wherein the material of said recording film is at least one of GeSbTe, $Ge_2Sb_2Te_5$, $Ge_1Sb_2Te_4$, $Ge_1Sb_4Te_7$ and Ag—In—Sb—Te type alloy.

8. The method according to claim 4, wherein the conductive wires comprise:

two pairs of wires, a first of said two pairs of wires contacting opposing sides of an outer circumference of the optical storage media through contacting parts and a second of said two pairs of wires contacting opposing sides of an inner circumference thereof.

9. An apparatus for initializing an optical storage media having a recording film comprising:

a power supply for applying a current;

contacting parts for connecting said recording film to said power supply; and switching means for switching an electric power from said power supply, wherein if said switching means is positioned to supply the power from said power supply, a current flows on said recording film solely causing a temperature of said recording film to exceed a crystallizing temperature of said recording film without using a catalytic material, and wherein a whole area of said recording film is simultaneously initialized for a recording operation, and wherein said switching means supplies the power for approximately 6 seconds or less and the power is supplied at approximately 600 volts or more.

10. A method for crystallizing an optical data storage media comprising:

applying electric energy to a recording film of said optical data storage media using conductive wires, the conductive wires contacting said recording film;

supplying said conductive wires with one of 600 V for 5 to 6 seconds, 800 V for 1 to 3 seconds and 1000 V for 1 to 2 seconds to crystallize a material forming said recording film based on heat generated in response to said electric energy applied to said recording film.

* * * * *